United States Patent
Helgeson et al.

(10) Patent No.: US 11,176,009 B2
(45) Date of Patent: Nov. 16, 2021

(54) IMPLEMENTING POWER UP DETECTION IN POWER DOWN CYCLE TO DYNAMICALLY IDENTIFY FAILED SYSTEM COMPONENT RESULTING IN LOSS OF RESOURCES PREVENTING IPL

(71) Applicant: International Business Machines Corporation, Armonk, NY (US)

(72) Inventors: Lee N. Helgeson, Rochester, MN (US); Derek Howard, Rochester, MN (US); Russel L. Young, Rochester, MN (US); George J. Romano, Rochester, MN (US); Mussie T. Negussie, West Sacramento, CA (US)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 16/161,733

(22) Filed: Oct. 16, 2018

(65) Prior Publication Data

US 2020/0117562 A1   Apr. 16, 2020

(51) Int. Cl.

| G06F 9/44 | (2018.01) |
|---|---|
| G06F 11/22 | (2006.01) |
| G06F 9/50 | (2006.01) |
| G06F 11/14 | (2006.01) |
| G06F 9/4401 | (2018.01) |

(52) U.S. Cl.
CPC ........ *G06F 11/2284* (2013.01); *G06F 9/4401* (2013.01); *G06F 9/5011* (2013.01); *G06F 11/1415* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| 4,566,102 A | * | 1/1986 | Hefner | G06F 11/2051 |
|---|---|---|---|---|
| | | | | 365/200 |
| 6,931,520 B2 | * | 8/2005 | Berstis | G06F 3/04817 |
| | | | | 713/1 |
| 6,978,398 B2 | | 12/2005 | Harper et al. | |
| 7,131,026 B2 | | 10/2006 | Denninghoff et al. | |
| 7,853,758 B2 | | 12/2010 | Clark et al. | |
| 7,861,117 B2 | | 12/2010 | Coronado et al. | |

(Continued)

OTHER PUBLICATIONS

Schubert et al.; "Accelerating System Integration by Enhancing Hardware, Firmware, and Co-Simulation", IBM Journal RES. & DEV., vol. 48, No. 3/4, May/Jul. 2004, pp. 569-581.

(Continued)

*Primary Examiner* — Zahid Choudhury
(74) *Attorney, Agent, or Firm* — Peter J. Edwards

(57) ABSTRACT

A method and apparatus for implementing power up detection in a power down cycle to dynamically determine whether a failed component in a system prevents another Initial Program Load (IPL) or re-IPL, or result in a loss of resources. Predefined mandatory functions are called to collect power down/up data that prevents re-IPL, or results in the reduction of resources. A user is notified, allowing the customer to continually utilize the system, while ordering hardware to be replaced.

20 Claims, 4 Drawing Sheets

(56) References Cited

U.S. PATENT DOCUMENTS

| | | |
|---|---|---|
| 7,873,957 B2 | 1/2011 | Nallipogu et al. |
| RE42,936 E | 11/2011 | Hollis |
| 8,099,630 B2 | 1/2012 | Lim |
| 8,230,429 B2 | 7/2012 | Lee et al. |
| 8,984,266 B2 * | 3/2015 | Wang .................... G06F 9/4401 713/2 |
| 9,026,777 B2 | 5/2015 | Brooks et al. |
| 2001/0020269 A1 | 9/2001 | Kawade et al. |
| 2005/0229039 A1 * | 10/2005 | Anderson ............. G06F 9/4401 714/23 |
| 2006/0259757 A1 | 11/2006 | Bailey et al. |
| 2007/0220335 A1 | 9/2007 | Gollub et al. |
| 2007/0294317 A1 | 12/2007 | Christy et al. |
| 2010/0153679 A1 | 6/2010 | Abdul et al. |
| 2010/0251029 A1 * | 9/2010 | Agha .................. G06F 11/2284 714/40 |
| 2014/0201565 A1 * | 7/2014 | Candea ................ G06F 11/079 714/6.2 |
| 2019/0339992 A1 * | 11/2019 | Barnette ............. G06F 11/3058 |
| 2020/0089572 A1 * | 3/2020 | Bodner .................... G06F 8/61 |

OTHER PUBLICATIONS

Salfner et al.; "Error Log Processing for Accurate Failure Prediction", WASL '08 ACM Proceedings of The First USENIX Conference on, Dec. 7, 2008, pp. 1-8.

* cited by examiner

IMPLEMENTING POWER UP DETECTION IN POWER DOWN CYCLE TO DYNAMICALLY IDENTIFY FAILED SYSTEM COMPONENT RESULTING IN LOSS OF RESOURCES PREVENTING IPL

FIELD OF THE INVENTION

The present disclosure relates generally to the data processing field, and more particularly, relates to a method and system for implementing power up detection in a power down cycle to dynamically determine whether a failed component in a system resulting in a loss of resources would prevent another Initial Program Load (IPL) or re-IPL.

BACKGROUND

A need exists for an efficient and effective system wide firmware mechanism to dynamically identify a failed component in a system that would prevent another Initial Program Load (IPL) or re-IPL, allowing the customer to continually utilize the system while ordering hardware that needs to be replaced.

SUMMARY

Principal aspects of the present disclosure are to provide method and apparatus for implementing power up detection in a power down cycle to dynamically determine whether a failed component in a system prevents another Initial Program Load (IPL) or re-IPL, or result in a loss of resources. Other important aspects of the present disclosure are to provide such method and apparatus substantially without negative effects and that overcome many of the disadvantages of prior art arrangements.

In brief, a method and apparatus for implementing power up detection in a power down cycle to dynamically determine whether a failed component in a system prevents another Initial Program Load (IPL) or re-IPL, or result in a loss of resources. Predefined mandatory functions are called to collect power down/up data that prevents re-IPL, or results in the reduction of resources. A user is notified, allowing the customer to continually utilize the system, while ordering hardware to be replaced.

In accordance with features of the disclosure, a firmware component manager is provided to manage multiple components system wide.

In accordance with features of the disclosure, performing power off self-test and a firmware component manager is built.

In accordance with features of the disclosure, any information that results in resource loss is collected.

BRIEF DESCRIPTION OF THE DRAWINGS

The present disclosure together with the above and other objects and advantages may best be understood from the following detailed description of the preferred embodiments of the disclosure illustrated in the drawings, wherein.

DETAILED DESCRIPTION OF THE PREFERRED EMBODIMENTS

In the following detailed description of embodiments of the disclosure, reference is made to the accompanying drawings, which illustrate example embodiments by which the disclosure may be practiced. It is to be understood that other embodiments may be utilized and structural changes may be made without departing from the scope of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the disclosure, a method and apparatus for implementing power up detection in a power down cycle to dynamically determine whether a failed component in a system prevents Initial Program Load (IPL) or re-IPL, or results in a loss of resources. Predefined mandatory functions are called to collect power down/up data that prevents re-IPL, or results in the reduction of resources. A user is notified not to re-IPL or power off the system, allowing the customer to continually utilize the system, while ordering hardware to be replaced.

Figure 1:
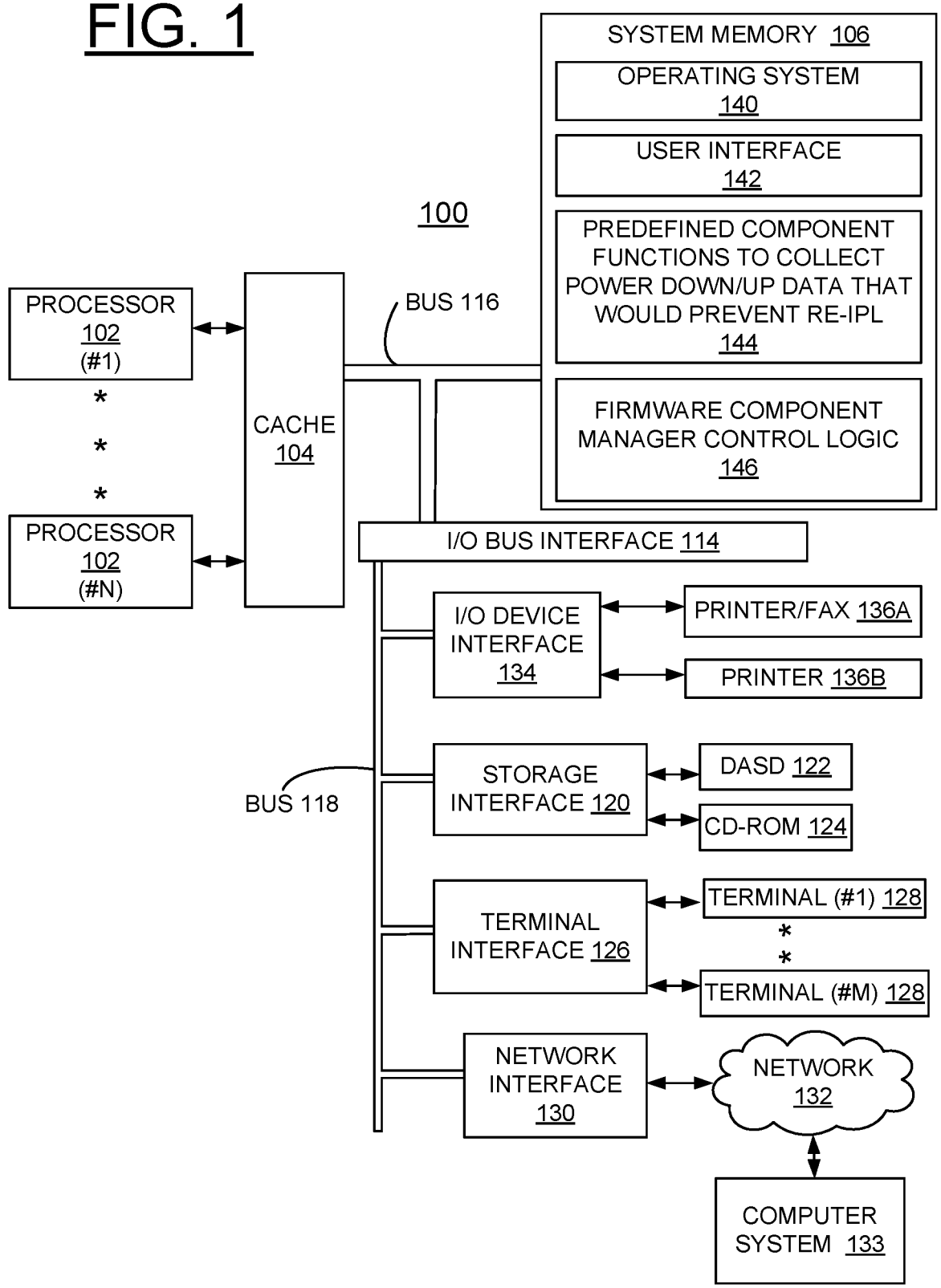
FIG. 1 is a block diagram of an example computer system for implementing power up detection in a power down cycle to dynamically determine whether a failed component in a system would result in a loss of resources in accordance with a preferred embodiment.

Referring now to FIG. 1, there is shown a computer system embodying the present invention generally designated by the reference character 100 for implementing enhanced dynamically determine whether a failed component in a system would prevent re-IPL or result in a loss of resources in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106. System memory 106 is a random-access semiconductor memory for storing data, including applications and programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, shown connected to another separate computer system 133, and a I/O device interface 134 coupled to I/O devices, such as a first printer/fax 136A, and a second printer 136B.

I/O bus interface 114 communicates with multiple I/O interface units 120, 126, 130, and 134, which are also known as I/O processors (IOPs) or I/O adapters (IOAs), through system I/O bus 116. System I/O bus 116 is, for example, an industry standard PCI bus, or other appropriate bus technology.

System memory 106 stores an operating system 140, a user interface 142, a predefined component functions to collect power down/up data that would prevent re IPL 144, and a firmware component manager control logic 146 in accordance with the preferred embodiments. Theredefined component functions to collect power down/up data that would prevent re IPL 144, and the firmware component manager control logic 146 together provide a system wide firmware mechanism to manage the firmware components to identify whether the system will be able to re-IPL and also warn the customers of reduced resources and failed re-IPL.

In accordance with features of the disclosure, multiple system wide components are encompassed and includes identifying resource reduction and errors, optionally including error logs. Managing the firmware components to identify whether the system will be able to re-IPL and also warn the customers of reduced resources due to the re-IPL are done by using power up detection in a power down cycle. To dynamically determine whether a failed component in a system would prevent re-IPL or would result in the reduction of resources is automatically detected, and then alerting the customer/user not to re-IPL or power off the system is performed.

Figure 2:
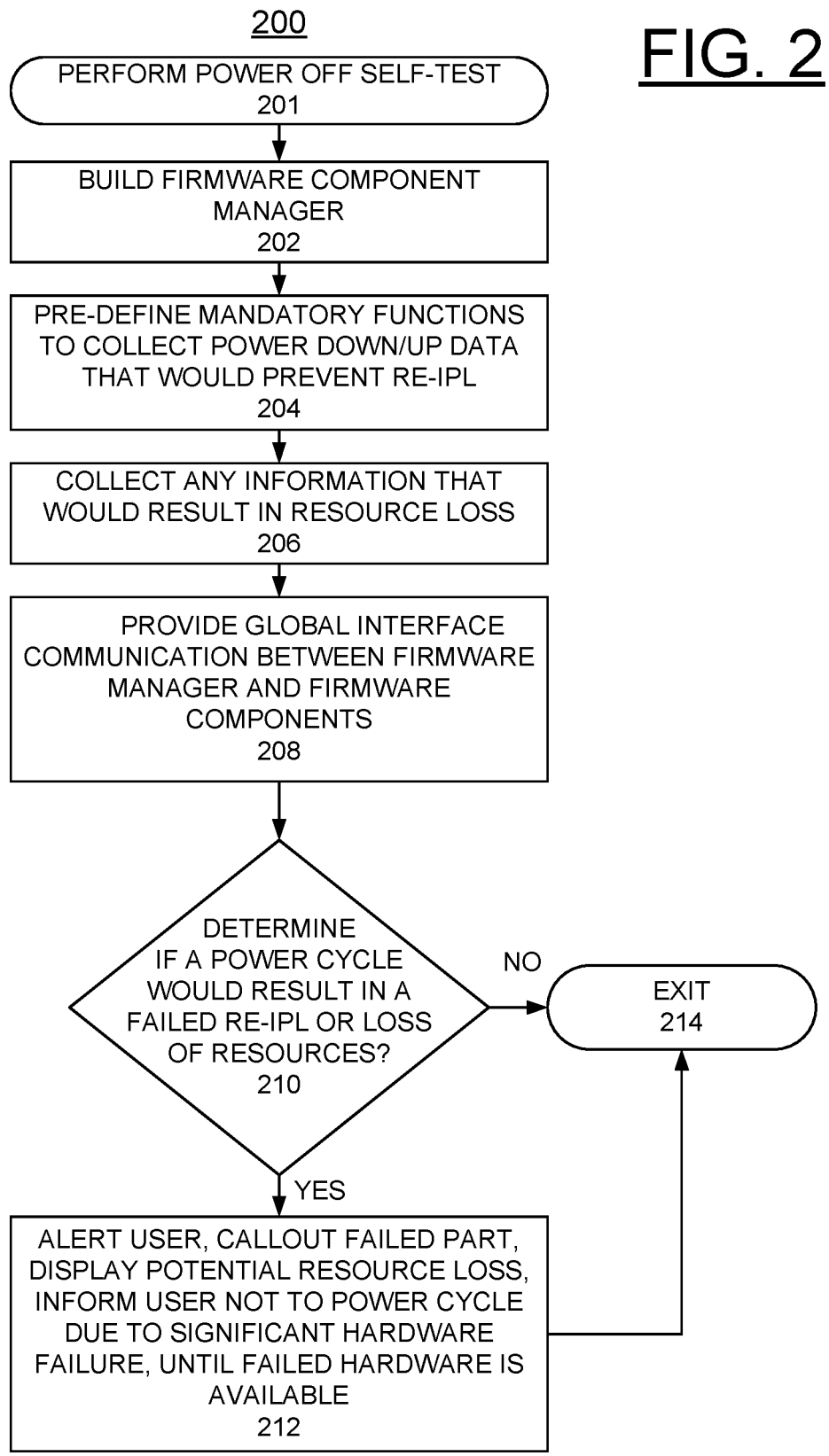
FIG. 2 is a flow chart illustrating example operations for implementing enhanced resource utilization with power up detection in a power down cycle to dynamically determine whether a failed component in a system would result in a loss of resources in accordance with a preferred embodiment.

Referring now to FIG. 2, there are shown example operations generally designated by reference character 200 for implementing enhanced resource utilization with power up detection in a power down cycle to dynamically determine whether a failed component in a system would result in a loss of resources in accordance with a preferred embodiment. As indicated at a block 201, power off self-test is performed. As indicated at a block 202, a firmware component manager is built, which is a system wide firmware component.

As indicated at a block 204, mandatory functions are pre-defined to collect power down/up data that would prevent re-IPL. For example, a system configuration is identified that prevent re-IPL, while the system can currently run in this configuration. For example, incorrect thermal readings could cause the system not to re-IPL, while the system can currently run with the actual temperatures. As indicated at a block 206, any information that would result in resource loss are collected.

As indicated at a block 208, global interface communication are provided between the firmware manager and firmware components. It is determined if a power cycle would result in a failed re-IPL or loss of resources, as indicated at a decision block 210. If determined that a power cycle would result in a failed re-IPL or loss of resources, the user is alerted, failed part or component is reported, and potential resource loss is displayed, as indicated at a block 212. At block 212, the user is informed not to power cycle to significant hardware failure until the failed hardware is available. Otherwise if determined that a power cycle would not result in a failed re-IPL or loss of resources, and after alerting the user, operations exit as indicated at a block 214.

Figure 3:
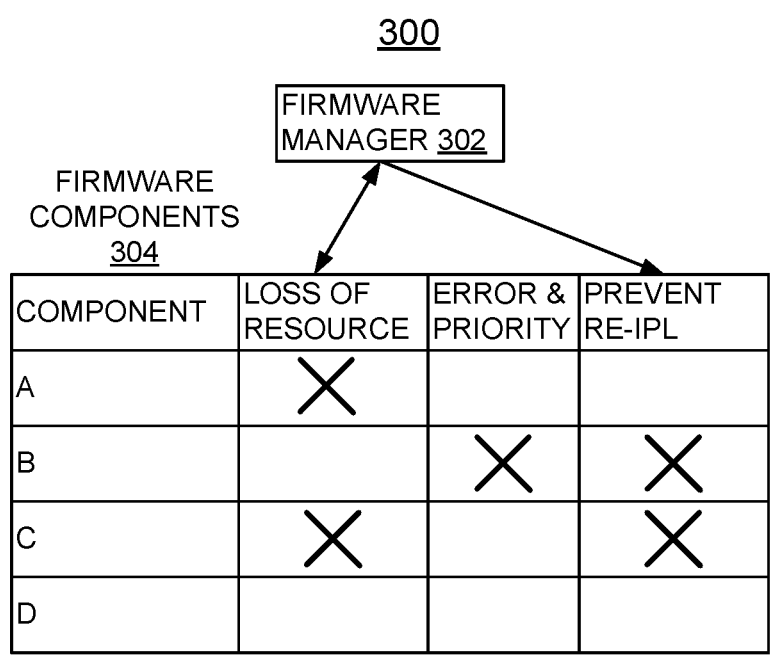
FIG. 3 is a chart illustrating example operations for implementing enhanced resource utilization with power up detection in a power down cycle to dynamically determine whether a failed component in a system would result in a loss of resources in accordance with the preferred embodiment.

Referring now to FIG. 3, there are shown example operations generally designated by reference character 300 for implementing enhanced resource utilization with power up detection in a power down cycle to dynamically determine whether a failed component in a system would result in a loss of resources in accordance with the preferred embodiment. A firmware manager 302 is shown with firmware components 304, A, B, C, and D. A loss of resource for components 304, A, and C, coupled between these components 304 and the firmware manager 302 and an error including priority level for component 304, B is shown. Re-IPL is prevented for components 304, B and C, as shown, coupled from the firmware manager 302.

It should be understood that the features of the disclosure are not limited to the illustrated criteria of loss of resource, error with priority level, and prevent re-IPL, as listed in FIG. Other criteria could be identified for firmware components, such as the firmware components 304, A, B, C, and D in accordance with features of the disclosure.

In brief summary, if any functions are determined that are failing that could cause the system not to re-IPL or result in loss of resources, the user or customer is automatically alerted, allowing the customer to continually utilize the system, while ordering the hardware that needs to be replaced.

Figure 4:
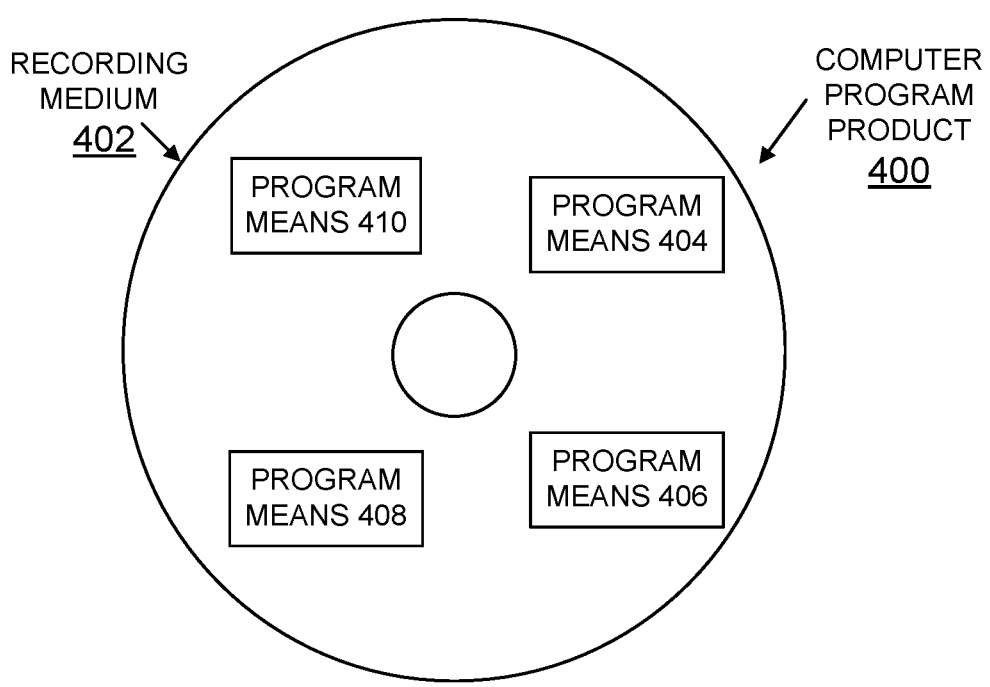
FIG. 4 is a block diagram illustrating a computer program product in accordance with the preferred embodiment.

Referring now to FIG. 4, an article of manufacture or a computer program product 400 of the invention is illustrated. The computer program product 400 is tangibly embodied on a non-transitory computer readable storage medium that includes a recording medium 402, such as, a floppy disk, a high capacity read only memory in the form of an optically read compact disk or CD-ROM, a tape, or another similar computer program product. The computer readable storage medium 402, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Recording medium 402 stores program means or instructions 404, 406, 408, and 410 on the non-transitory computer readable storage medium 402 for carrying out the methods for implementing power up detection in a power down cycle to dynamically determine whether a failed component would prevent re-IPL or result in a loss of resources in the system 100 of FIG. 1.

Computer readable program instructions 404, 406, 408, and 410 described herein can be downloaded to respective computing/processing devices from a computer readable storage medium or to an external computer or external storage device via a network, for example, the Internet, a local area network, a wide area network and/or a wireless network. The computer program product 400 may include cloud based software residing as a cloud application, commonly referred to by the acronym (SaaS) Software as a Service. The network may comprise copper transmission cables, optical transmission fibers, wireless transmission, routers, firewalls, switches, gateway computers and/or edge servers. A network adapter card or network interface in each computing/processing device receives computer readable program instructions 404, 406, 408, and 410 from the network and forwards the computer readable program instructions for storage in a computer readable storage medium within the respective computing/processing device.

A sequence of program instructions or a logical assembly of one or more interrelated modules defined by the recorded program means 404, 406, 408, and 410, direct the system 100 for implementing enhanced resource utilization of the preferred embodiment.

While the present disclosure has been described with reference to the details of the embodiments of the disclosure shown in the drawing, these details are not intended to limit the scope of the disclosure as claimed in the appended claims.

What is claimed is:

1. An apparatus for implementing power up detection in a power down cycle to dynamically determine whether a failed component in a system would prevent re-IPL or result in a loss of resources comprising:
    a system wide firmware component manager;
    the system wide firmware component manager configured to collect power down/up data that prevents re-IPL wherein collecting the power down/up data comprises identifying the system is able to run with the system's actual temperatures, but that incorrect system thermal readings would cause the system to not re-IPL; and
    the system wide firmware component manager configured to notify a user to prevent re-IPL, allowing the customer to continually utilize the system, while ordering hardware to be replaced.

2. The apparatus as recited in claim 1, includes the system wide firmware component manager configured to perform power off self-test, and build the system wide firmware component manager.

3. The apparatus as recited in claim 1, includes the system wide firmware component manager configured to collect any information that results in resource loss.

4. The apparatus as recited in claim 1, includes global interface communication between the system wide firmware component manager and firmware components.

5. The apparatus as recited in claim 4, wherein the global interface communication between the system wide firmware component manager and firmware components is configured to identify loss of resource.

6. The apparatus as recited in claim 5, wherein the global interface communication between the system wide firmware component manager and firmware components is configured to identify error.

7. The apparatus as recited in claim 6, wherein the system wide firmware component manager is configured to use identified loss of resource and identified error to prevent re-IPL.

8. The apparatus as recited in claim 1, include the system wide firmware component manager configured to alert the user and identify failed hardware and potential loss of resources.

9. The apparatus as recited in claim 8, further includes the system wide firmware component manager configured to notify the user not to power cycle due to hardware failure until failed hardware is available.

10. A method for implementing power up detection in a power down cycle to dynamically determine whether a failed component in a system would prevent re-IPL or result in a loss of resources comprising:
    providing a system wide firmware component manager;
    collecting power down/up data that prevents re-IPL, wherein collecting the power down/up data comprises identifying that the system is able to run with the system's actual temperatures, but that incorrect system thermal readings would cause the system to not re-IPL; and
    notifying a user to prevent re-IPL, allowing the customer to continually utilize the system, while ordering hardware to be replaced.

11. The method as recited in claim 10, wherein notifying the user includes alerting user and identifying failed hardware.

12. The method as recited in claim 11, includes notifying the user of potential loss of resources.

13. The method as recited in claim 10, includes notifying the user not to power cycle due to hardware failure until failed hardware is available.

14. The method as recited in claim 10, wherein providing a system wide firmware component manager includes providing control code for performing power off self-test and building the system wide firmware component manager.

15. The method as recited in claim 10, includes providing predefined mandatory functions to collect power down/up data that prevents re-IPL.

16. The method as recited in claim 10, includes providing global interface communication between the system wide firmware component manager and firmware components.

17. The method as recited in claim 16, includes using the global interface communication between the system wide firmware component manager and firmware components to identify error.

18. The method as recited in claim 16, includes using the global interface communication between the system wide firmware component manager and firmware components to identify loss of resource.

19. The method as recited in claim 10, using identified loss of resource and identified error to notify user not to power cycle.

20. The method as recited in claim 10, includes notifying the user not to power cycle due to hardware failure until failed hardware is available.

\* \* \* \* \*